(12) United States Patent
Kuwashima (10) Patent No.: US 8,448,771 B2
(45) Date of Patent: May 28, 2013

(54) DOG CLUTCH GEAR

(75) Inventor: Satoshi Kuwashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 13/019,604

(22) Filed: Feb. 2, 2011

(65) Prior Publication Data

US 2011/0198188 A1  Aug. 18, 2011

(30) Foreign Application Priority Data

Feb. 12, 2010  (JP) ................................. 2010-029067

(51) Int. Cl.
*F16D 11/10* (2006.01)
*F16H 55/17* (2006.01)

(52) U.S. Cl.
USPC ............... 192/108; 192/69.7; 74/333; 74/431

(58) Field of Classification Search
USPC .......................... 192/69.7, 69.71, 108; 74/431
See application file for complete search history.

(56) References Cited

U.S. PATENT DOCUMENTS

| | | | |
|---|---|---|---|
| 3,245,280 A | 4/1966 | Mooney | |
| 6,354,417 B1 * | 3/2002 | Narita et al. ............... | 192/69.71 |
| 2005/0016309 A1 | 1/2005 | Okada et al. | |
| 2009/0084210 A1 * | 4/2009 | Tsukada et al. ................ | 74/330 |

FOREIGN PATENT DOCUMENTS

| | | |
|---|---|---|
| CN | 1225426 A | 8/1999 |
| CN | 101176925 A | 5/2008 |
| CN | 201212554 Y | 3/2009 |
| EP | 0 949 435 A2 | 10/1999 |
| JP | 2003-301859 A | 10/2003 |
| JP | 2009-209950 A | 9/2009 |

* cited by examiner

*Primary Examiner* — Richard M. Lorence
(74) *Attorney, Agent, or Firm* — Westerman, Hattori, Daniels & Adrian, LLP (57) ABSTRACT

A dog clutch gear is provided that can prevent stress concentration due to a machined edge from occurring in the dog clutch gear and that can prevent a cutting load from being intermittently applied to a cutting tool to lengthen the lifetime of the cutting tool. The dog clutch gear includes a rim portion formed with power transmission teeth on the outer circumference; a boss portion fitted to a rotating shaft; an annular connecting portion connecting the rim portion with the boss portion; and a dog member formed on a lateral surface of the annular connecting portion. A machined surface is formed on an axial end surface of the boss portion. A runout groove axially continuing from the dog member toward the axial end surface of the boss portion is formed at a joint portion between the boss portion and the dog member.

10 Claims, 10 Drawing Sheets

DOG CLUTCH GEAR

TECHNICAL FIELD

A dog clutch gears for a transmission is disclosed. In particular, a dog clutch gear for a transmission of a motorcycle is disclosed.

BACKGROUND OF THE INVENTION

There is known a conventional dog clutch gear in which engaging convex portions are provided on one of the opposite end surfaces of two gears adjacently installed on a rotating shaft and engaging concave portions meshing with the engaging convex portions are provided on the other. In addition, the gears are axially relatively shifted to allow the engaging convex portions and the engaging concave portions to engage with each other, thereby transmitting torque between the gears (see e.g. Japanese Patent Laid-open No. 2009-209950). The dog clutch gear described in Japanese Patent Laid-open No. 2009-209950 includes a rim portion having gear teeth on the outer circumferential portion; a boss portion fitted to a rotating shaft; and an annular wall portion connecting the rim portion with the boss portion and formed with engaging concave portions. In addition, the bottom wall of the engaging concave portion is provided with an oval weight-reduction hole so as to leave the bottom wall close to an engaging surface with the engaging convex portion.

Figure 9:
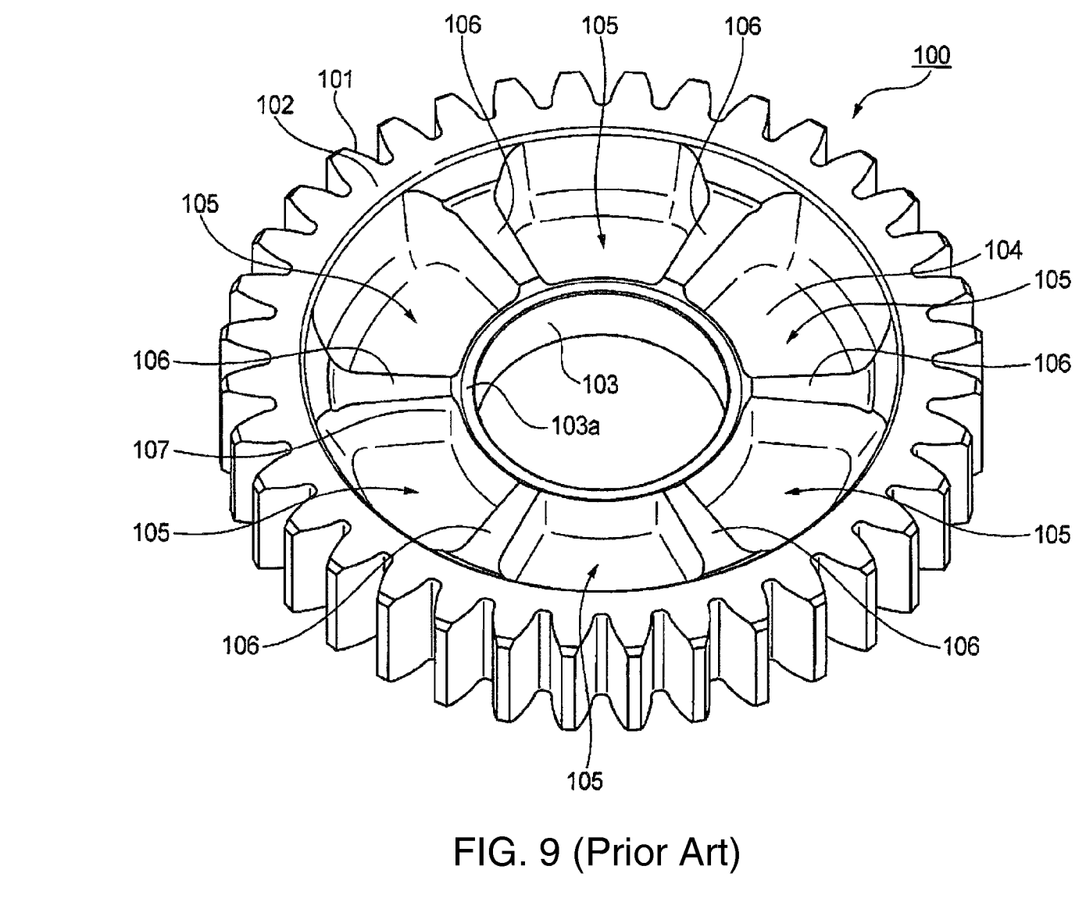
FIG. 9 is a perspective view of a conventional dog clutch gear.
Figure 10:
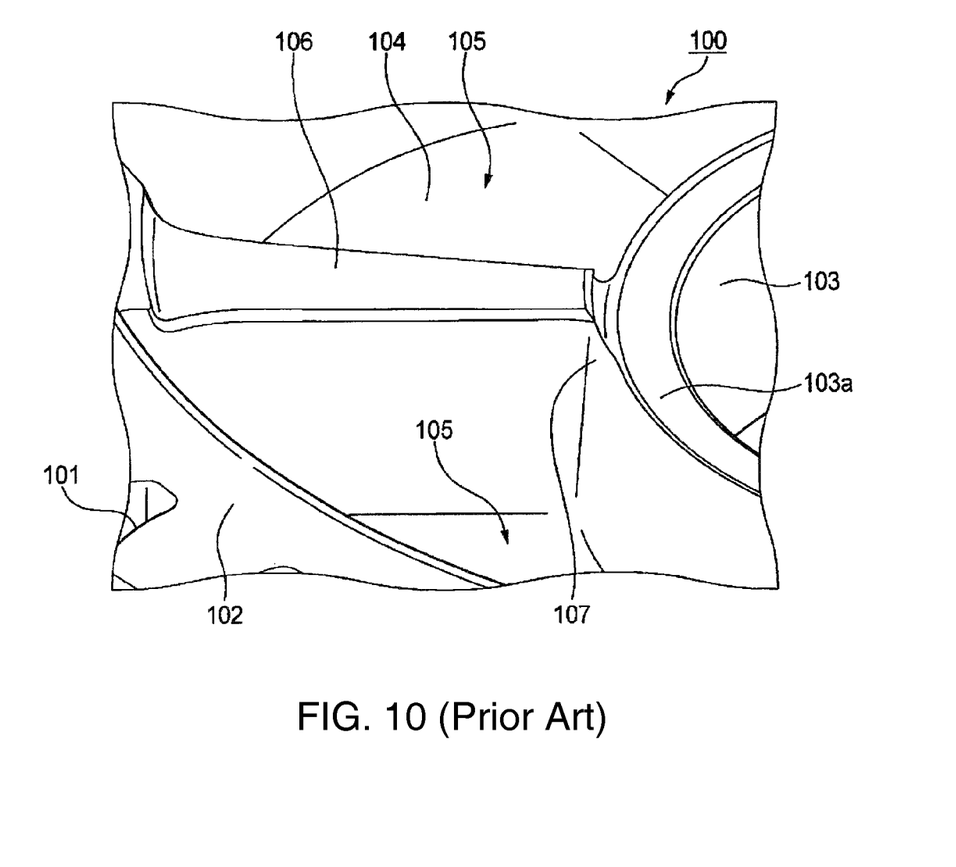
FIG. 10 is an enlarged perspective view of the periphery of a rib in FIG. 9.

A dog clutch gear 100 as illustrated in FIGS. 9 and 10 is known as a conventional dog clutch gear. This dog clutch gear 100 includes a rim portion 102 having gear teeth 101 on the outer circumference; a boss portion 103 fitted to a rotating shaft; an annular connecting portion 104 connecting the rim portion 102 with the boss portion 103; a plurality of engaging concave portions 105 formed on a lateral surface of the annular connecting portion 104 at circumferentially generally-regular intervals; and a plurality of ribs 106 each formed between the engaging concave portions 105, 105 adjacent to each other. Since the engagement between the ribs and engaging convex portions (not illustrated) transmits a rotational drive force, a large force is applied to the ribs 106.

In the conventional dog clutch gear 100, however, if an axial end surface 103 of the boss portion 103 is machined, a machined edge is formed at a joint portion 107 between the boss portion 103 and the rib 106. There is a possibility that stress concentration resulting from the transfer of the rotational drive force occurs at the machined edge. During the machining of the axial end surface 103a of the boss portion 103, also the plurality of ribs 106 each formed at circumferentially generally-regular intervals are subjected to cutting work. Therefore, a cutting load is intermittently applied to a cutting tool of a lathe or the like, which probably shortens the lifetime of the cutting tool.

A dog clutch gear is provided that can prevent stress concentration due to a machined edge from occurring in the dog clutch gear and that can prevent a cutting load from being intermittently applied to the cutting tool to lengthen the lifetime of the cutting tool.

A dog clutch gear includes a rim portion having power transmission teeth on an outer circumference; a boss portion fittable to a rotating shaft; an annular connecting portion connecting the rim portion with the boss portion; and a dog member formed on a lateral surface of the annular connecting portion, the dog clutch gear being engaged with the dog member of an adjacent gear, on the rotating shaft, to transfer a rotational force, is characterized in that a machined surface is formed on an axial end surface of the boss portion and in that a runout groove axially continuing from the dog member toward the axial end surface of the boss portion is formed at a joint portion between the boss portion and the dog member.

In addition, to the runout groove is formed to extend from the axial end surface of the boss portion toward an axial inside of said dog clutch gear.

In addition, the runout groove is formed to smoothly connect a circumferential lateral surface of the dog member with an outer circumferential lateral surface of the boss portion of the boss portion.

In addition a runout groove axially continuing from the dog member toward an axial end surface of the rim portion is formed at a joint portion between the rim portion and the dog member.

In addition, the runout groove is formed in a generally semicircular shape in cross-section, about a central axis of the dog clutch gear.

In addition, the runout groove is formed in a bowl shape in cross-section, about a central axis of the dog clutch gear.

In addition, the runout groove is formed to smoothly continue from a bottom thereof toward a circumferential lateral surface of the dog member.

In addition, the dog member side end surface forming part of the runout groove is formed to smoothly continue from an inner circumferential direction toward an outer circumferential direction.

The machined surface is formed on the axial end surface of the boss portion and the runout groove axially continuing from the dog member toward the axial end surface of the boss portion is formed at the joint portion between the boss portion and the dog member. Therefore, when the axial end surface of the boss portion is machined, the dog member will not be subjected to cutting work. In this way, since a machined edge is not formed at the joint portion, it is possible to prevent stress concentration due to the machined edge from occurring in the dog clutch gear, which can improve the durability of the dog clutch gear. Since the dog member is not subjected to cutting work, it is possible to prevent a cutting load from being intermittently applied to the cutting tool, which can lengthen the lifetime of the cutting tool.

The runout groove is formed to extend from the axial end surface of the boss portion toward the axial inside. Therefore, even if the axial end surface of the boss portion is machined with a large machining margin, the machined edge is not formed at the joint portion between the boss portion and the dog member. Thus, it is possible to prevent stress concentration due to the machined edge from occurring in the dog clutch gear, which can improve the durability of the dog clutch gear.

The runout groove is formed to smoothly connect the circumferential lateral surface of the dog member with the outer circumferential lateral surface of the boss portion. Therefore, it is possible to reduce stress applied to the runout groove, which can further improve the durability of the dog clutch gear.

The runout groove axially continuing from the dog member toward the axial end surface of the rim portion is formed at the joint portion between the rim portion and the dog member as well as at the joint portion between the boss portion and the dog member. Therefore, it is possible to prevent stress concentration from occurring at both ends of the dog member, which can further improve the durability of the dog clutch gear.

The runout groove is formed in a generally semicircular shape in cross-section, about the central axis of the dog clutch gear. Therefore, it is possible to reduce stress applied to the runout groove, which can further improve the durability of the dog clutch gear.

The runout groove is formed in a bowl shape in the cross-section, about the central axis of the dog clutch gear. Therefore, it is possible to reduce stress applied to the runout groove, which can further improve the durability of the dog clutch gear.

The runout groove is formed to smoothly continue from the bottom thereof toward the circumferential lateral surface of the dog member. Therefore, it is possible to reduce stress applied to the runout groove, which can further improve the durability of the dog clutch gear.

The dog member side lateral surface forming part of the runout groove is formed to smoothly continue from the inner circumferential direction toward the outer circumferential direction. Therefore, it is possible to reduce the number of places where stress concentration occurs.

BRIEF DESCRIPTION OF THE DRAWINGS

The advantages of the invention will become apparent in the following description taken in conjunction with the drawings, wherein.

DETAILED DESCRIPTION OF THE INVENTION

Embodiments of a dog clutch gear will hereinafter be described in detail with reference to the drawings. It is to be noted that the drawings shall be viewed based on the orientation of reference numerals.

First Embodiment

Figure 1:
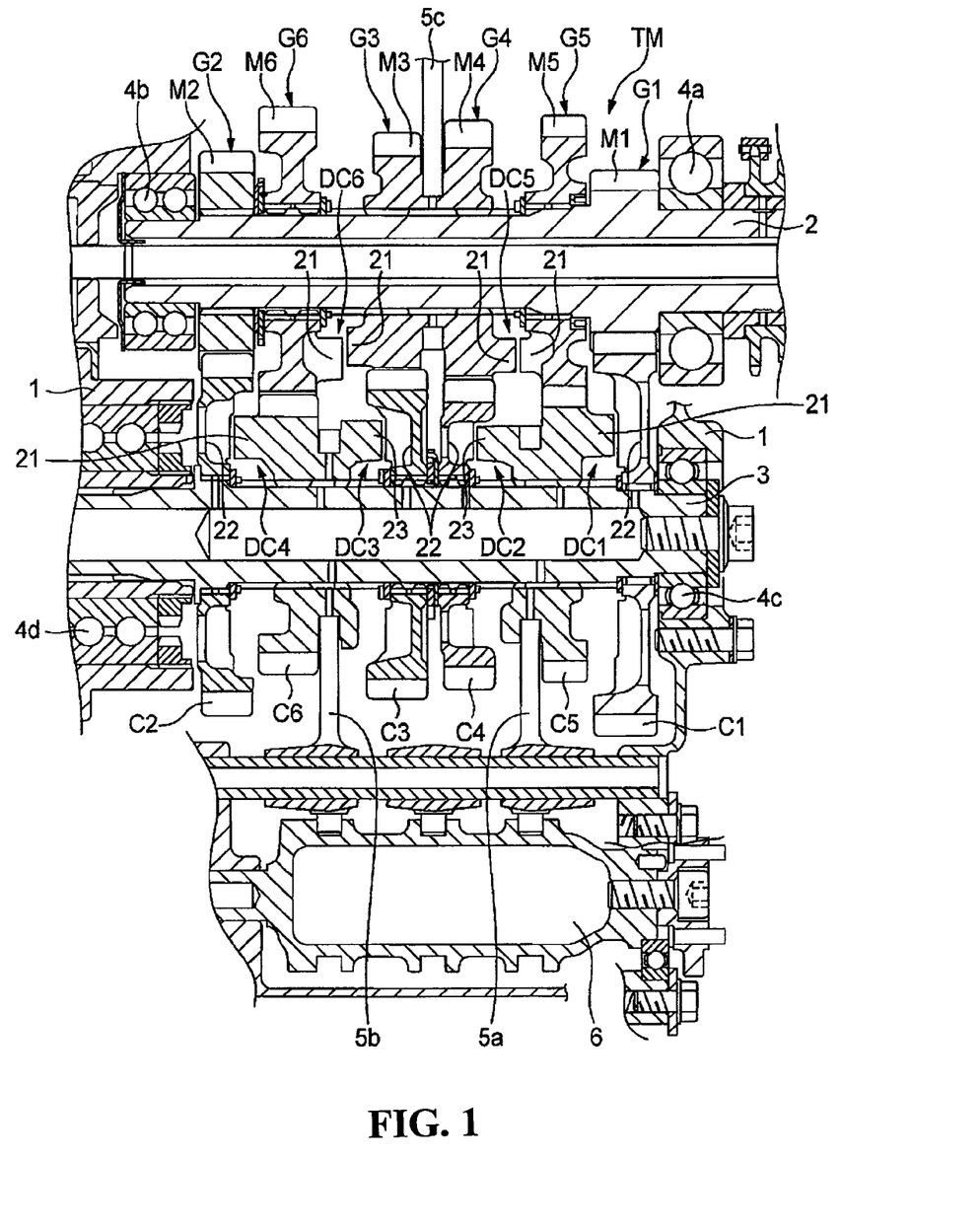
FIG. 1 is a cross-sectional view of a transmission on which dog clutch gears are mounted according to each of embodiments.

A description is first given of a transmission TM on which a dog clutch gear of the present embodiment is mounted. Referring to FIG. 1, this transmission TM includes a main shaft 2 rotatably supported by a crankcase 1 via ball bearings 4a, 4b; a counter shaft 3 disposed parallel to the main shaft 2 and rotatably supported by the crankcase 1 via ball bearings 4c, 4d; and first-speed through sixth-speed gear trains G1 to G6 disposed between the main shaft 2 and the counter shaft 3 to transmit the rotational drive force of the main shaft 2 to the counter shaft 3.

The first-speed gear train G1 includes a first-speed drive gear M1 provided on the main shaft 2 integrally therewith and a first-speed driven gear (dog clutch gear) C1 supported by the counter shaft 3 so as to be incapable of axial movement and capable of relative rotation and meshing with the first-speed drive gear M1.

The second-speed gear train G2 includes a second-speed drive gear M2 supported by the main shaft 2 so as to be incapable of axial movement and incapable of relative movement and a second-speed driven gear (dog clutch gear) C2 supported by the counter shaft 3 so as to be incapable of axial movement and capable of relative rotation and meshing with the second-speed drive gear M2.

The third-speed gear train G3 includes a third-speed drive gear (dog clutch gear) M3 supported by the main shaft 2 so as to be capable of axial movement and incapable of relative rotation and a third-speed driven gear (dog clutch gear) C3 supported by the counter shaft 3 so as to be incapable of axial movement and capable of relative rotation and meshing with the third-speed drive gear M3.

The fourth-speed gear train G4 includes a fourth-speed drive gear (dog clutch gear) M4 provided integrally with the third-speed drive gear M3 and supported by the main shaft 2 so as to be capable of axial movement and incapable of relative rotation; and a fourth-speed driven gear (dog clutch gear) C4 supported by the counter shaft 3 so as to be incapable of axial movement and capable of relative rotation and meshing with the fourth-speed drive gear M4.

The fifth-speed gear train G5 includes a fifth-speed drive gear (dog clutch gear) M5 supported by the main shaft 2 so as to be incapable of axial movement and capable of relative rotation; and a fifth-speed driven gear (dog clutch gear) C5 supported by the counter shaft 3 so as to be capable of axial movement and incapable of relative rotation and meshing with the fifth-speed drive gear M5.

The sixth-speed gear train G6 includes a sixth-speed drive gear (dog clutch gear) M6 supported by the main shaft 2 so as to be incapable of axial movement and capable of relative rotation; and a sixth-speed driven gear (dog clutch gear) C6 supported by the counter shaft 3 so as to be capable of axial movement and incapable of relative rotation and meshing with the sixth-speed drive gear M6.

A first dog clutch DC1 is provided between the fifth-speed driven gear C5 which is a shifter gear and the first-speed driven gear C1. In addition, the first dog clutch DC1 is such that a plurality of engaging convex portions (dog members) 21 and engaging concave portions 22 which are engageable with each other are formed on one and the other of opposing end surfaces of the fifth-speed driven gear C5 and the first-speed driven gears C1 at circumferentially generally-regular intervals.

A second dog clutch DC2 is provided between the fifth-speed driven gear C5 which is a shifter gear and the fourth-speed driven gear C4. In addition, the second dog clutch DC2 is such that a plurality of engaging convex portions (dog members) 23 and engaging concave portions 22 which are engageable with each other are formed on one and the other of opposing end surfaces of the fifth-speed driven gear C5 and of the fourth-speed driven gears C4 at circumferentially generally-regular intervals.

A third dog clutch DC3 is provided between the sixth-speed driven gear C6 which is a shifter gear and the third-speed driven gear C3. In addition, the third dog clutch DC3 is such that a plurality of engaging convex portions (dog members) 23 and engaging concave portions 22 which are engageable with each other are formed on one and the other of opposing end surfaces of the sixth-speed driven gear C6 and of the third-speed driven gears C3 at circumferentially generally-regular intervals.

A fourth dog clutch DC4 is provided between the sixth-speed driven gear C6 which is a shifter gear and the second-speed driven gear C2. In addition, the fourth dog clutch DC4 is such that a plurality of engaging convex portions (dog members) 21 and engaging concave portions 22 which are engageable with each other are formed on one and the other of opposing end surfaces of the sixth-speed driven gear C6 and of the second-speed driven gears C2 at circumferentially generally-regular intervals.

A fifth dog clutch DC5 is provided between the fourth-speed drive gear M4 which is a shifter gear and the fifth-speed drive gear M5. In addition, the fifth dog clutch DC5 is such that a plurality of engaging convex portions (dog members) 21 and engaging concave portions 22 which are engageable with each other are formed on one and the other of opposing end surfaces of the fourth-speed drive gear M4 and of the fifth-speed drive gears M5 at circumferentially generally-regular intervals.

A sixth dog clutch DC6 is provided between the third-speed drive gear M3 which is a shifter gear and the sixth-speed drive gear M6. In addition, the sixth dog clutch DC is such that a plurality of engaging convex portions (dog members) 21 and engaging concave portions 22 which are engageable with each other are formed on one and the other of opposing end surfaces of the third-speed drive gear M3 and of the sixth-speed drive gears M6 at circumferentially generally-regular intervals.

The fifth-speed and six-speed driven gears C5, C6 which are shifter gears, and the third-speed and fourth-speed drive gears M3, M4, which are formed integrally with each other, are each held by a corresponding one of first, second and third shift forks 5a, 5b, 5c in a turnable manner. In addition, each of them is axially slidably shifted by a corresponding one of the first through third shift forks 5a, 5b, 5c axially driven by a shift drum 6. For example, the fifth-speed driven gear C5 is axially slidably shifted by the first shift fork 5a, which makes it possible to switch the following states: a state where the engaging convex portion 21 of the fifth-speed driven gear C5 is engaged with the engaging concave portion 22 of the first-speed driven gear C1; a state where the engaging convex portion 23 of the fifth-speed driven gear C5 is engaged with the engaging concave portion 22 of the fourth-speed driven gear C4; and a neutral state where the engaging convex portions 21, 23 of the fifth-speed driven gear C5 are each engaged with none of the concave portions 22.

Figure 2:
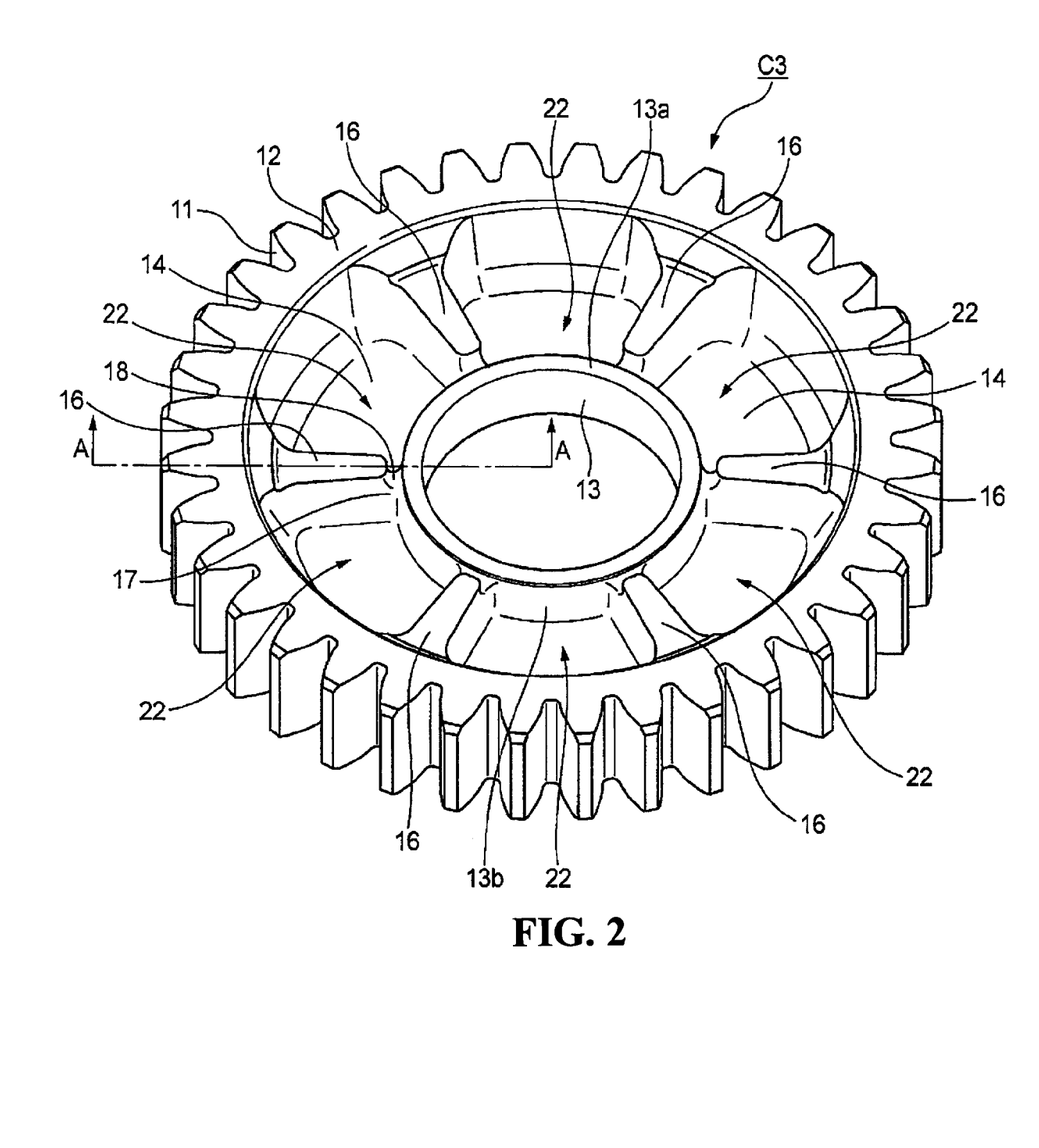
FIG. 2 is a perspective view of a first embodiment of a dog clutch gear.
Figure 3:
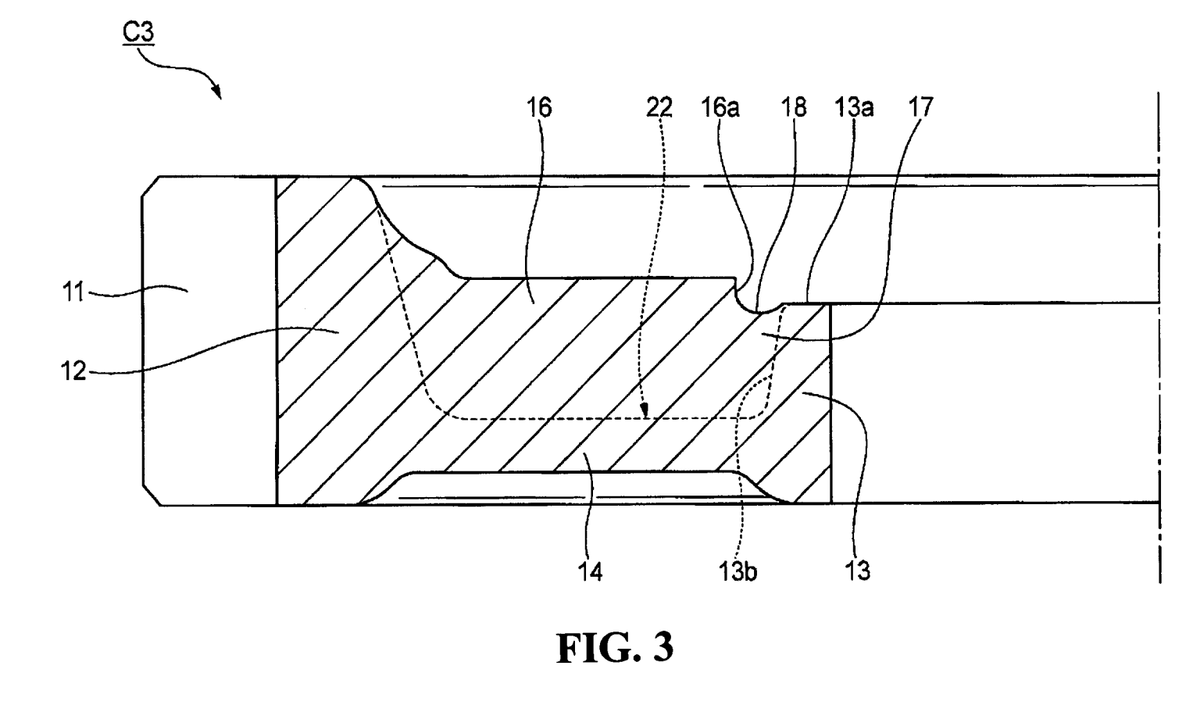
FIG. 3 is a cross-sectional view taken along line A-A in FIG. 2.
Figure 4:
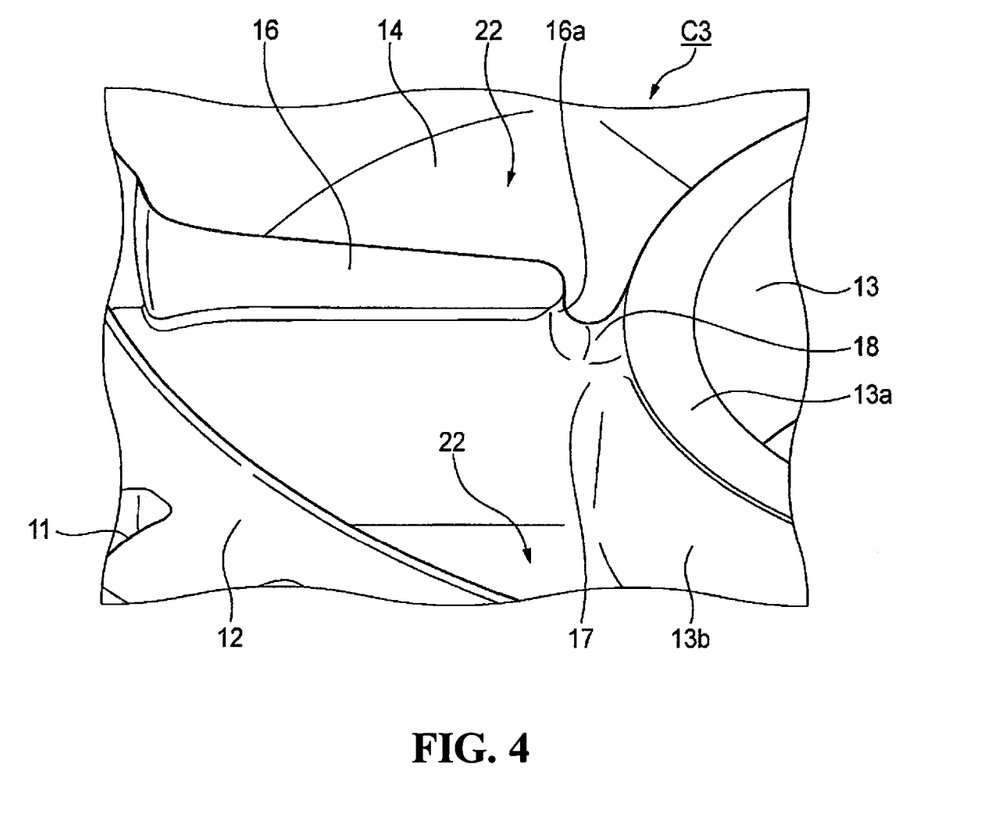
FIG. 4 is an enlarged perspective view of the periphery of a rib illustrated in FIG. 2.

A dog clutch gear of the present embodiment is next described taking the third-speed driven gear C3 as an example. As illustrated in FIGS. 2 to 4, the third-speed driven gear C3 includes a rim portion 12 formed with gear teeth (power transmission teeth) on the outer circumference; a boss portion 13 fitted to the counter shaft 3 (a rotating shaft) (see FIG. 1); an annular connecting portion 14 connecting the rim portion 12 with the boss portion 13; and a plurality of (six in the present embodiment) engaging concave portions 22 formed on a lateral surface of the annular connecting portion 14 at circumferentially generally-regular intervals.

As illustrated in FIG. 2, the engaging concave portions 22 are defined by the rim portion 12, the boss portion 13, and a plurality of (six in the embodiment) ribs 16, dog members, radially connecting the rim portion 12 with the boss portion 13 and formed at circumferentially generally-regular intervals.

Referring to FIGS. 3 and 4, in the present embodiment, a runout groove 18 axially continuing from the rib 16 toward the axial end surface 13a of the boss portion 13 is formed at the joint portion between the boss portion 13 and the rib 16. The runout groove 18 is formed to extend from the axial end surface 13a of the boss portion 13 toward the axial inside. The runout groove 18 is formed to smoothly connect a circumferential lateral surface 16a of the rib 16 with an outer circumferential lateral surface 13b of the boss portion 13. The runout groove 18 is formed in a generally semicircular shape in cross-section, around the central axis of the third-speed driven gear C3. The runout groove 18 is formed to smoothly continue from its bottom toward the circumferential lateral surface 16a of the rib 16. A rib 16 side end surface forming part of the runout groove 18 is formed to smoothly continue from the inner circumferential direction toward the outer circumferential direction. The axial end surface 13a of the boss portion 13 is subjected to lathe turning by means of a lathe or the like to form a machined surface.

As described above, in the third-speed driven gear C3 which is the dog clutch gear of the present embodiment, the axial end surface 13a of the boss portion 13 is formed with the machined surface. In addition, the runout groove 18 axially continuing from the rib 16 toward the axial end surface 13a of the boss portion 13 is formed at the joint portion 17 between the boss portion 13 and the rib 16 which is a dog member. Therefore, when the axial end surface 13a of the boss portion 13 is machined, the rib 16 will not be subjected to cutting work. In this way, a machined edge is not formed at the joint portion 17. Therefore, it is possible to prevent stress concentration due to the machined edge from occurring at the third-speed driven gear C3, which can improve the durability of the third-speed driven gear C3. Since the rib 16 is not subjected to cutting work, it is possible to prevent a cutting load from being intermittently applied to a cutting tool, which lengthens the lifetime of the cutting tool.

In the third-speed driven gear C3 of the present embodiment, the runout groove 18 is formed to extend from the axial end surface 13a of the boss portion 13 toward the axial inside. Therefore, even if the axial end surface 13a of the boss portion 13 is machined with a large machining margin, no machined edge will be formed at the joint portion 17. Thus, it is possible to prevent stress concentration due to the machined edge from occurring at the third-speed driven gear C3, which can improve the durability of the third-speed driven gear C3.

In the third-speed driven gear C3 of the present embodiment, the runout groove 18 is formed to smoothly connect the circumferential lateral surface 16a of the rib 16 with the outer circumferential lateral surface 13b of the boss portion 13. Therefore, it is possible to reduce stress applied to the runout groove 18, which can further improve the durability of the third-speed driven gear C3.

In the third-speed driven gear C3 of the present embodiment, the runout groove 18 is formed in a generally semicircular shape in cross-section, around the central axis of the third-speed driven gear C3. Therefore, it is possible to reduce stress applied to the runout groove 18, which can further improve the durability of the third-speed driven gear.

In the third-speed driven gear C3 of the present embodiment, the runout groove 18 is formed to smoothly continue from its bottom toward the circumferentially lateral surface 16a of the rib 16. Therefore, it is possible to reduce stress applied to the runout groove 18, which can further improve the durability of the third-speed driven gear C3.

In the third-speed driven gear C3 of the present embodiment, the rib 16 side end surface forming part of the runout groove 18 is formed to smoothly continue from the inner circumferential direction toward the outer circumferential direction. Therefore, it is possible to reduce the number of places where stress concentration occurs.

Second Embodiment

A second embodiment of the dog clutch gear is next described with reference to FIGS. 5 and 6. Incidentally, the identical or the same portions as those of the first embodiment are denoted with like reference numerals and their explanations are omitted or simplified.

Figure 5:
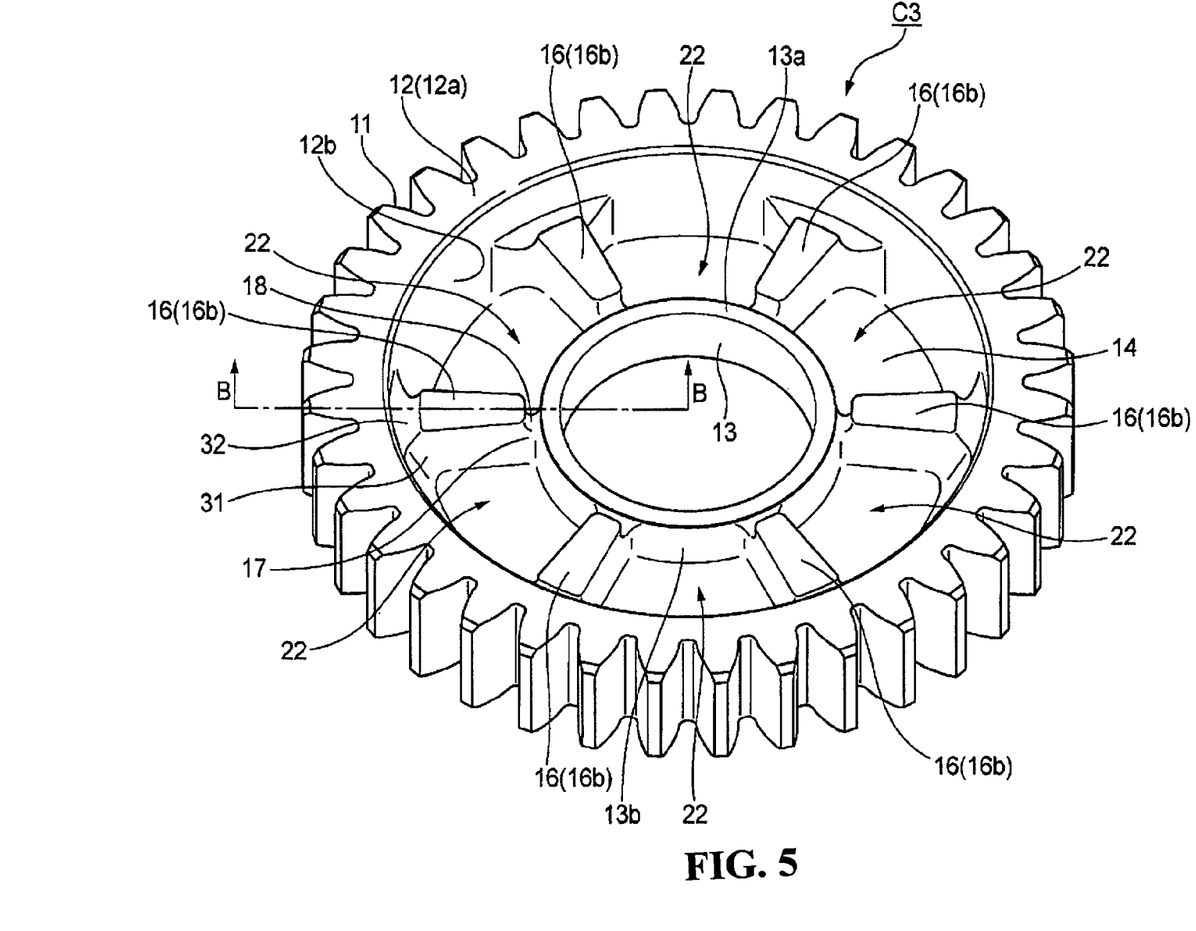
FIG. 5 is a perspective view of a second embodiment of the dog clutch gear.
Figure 6:
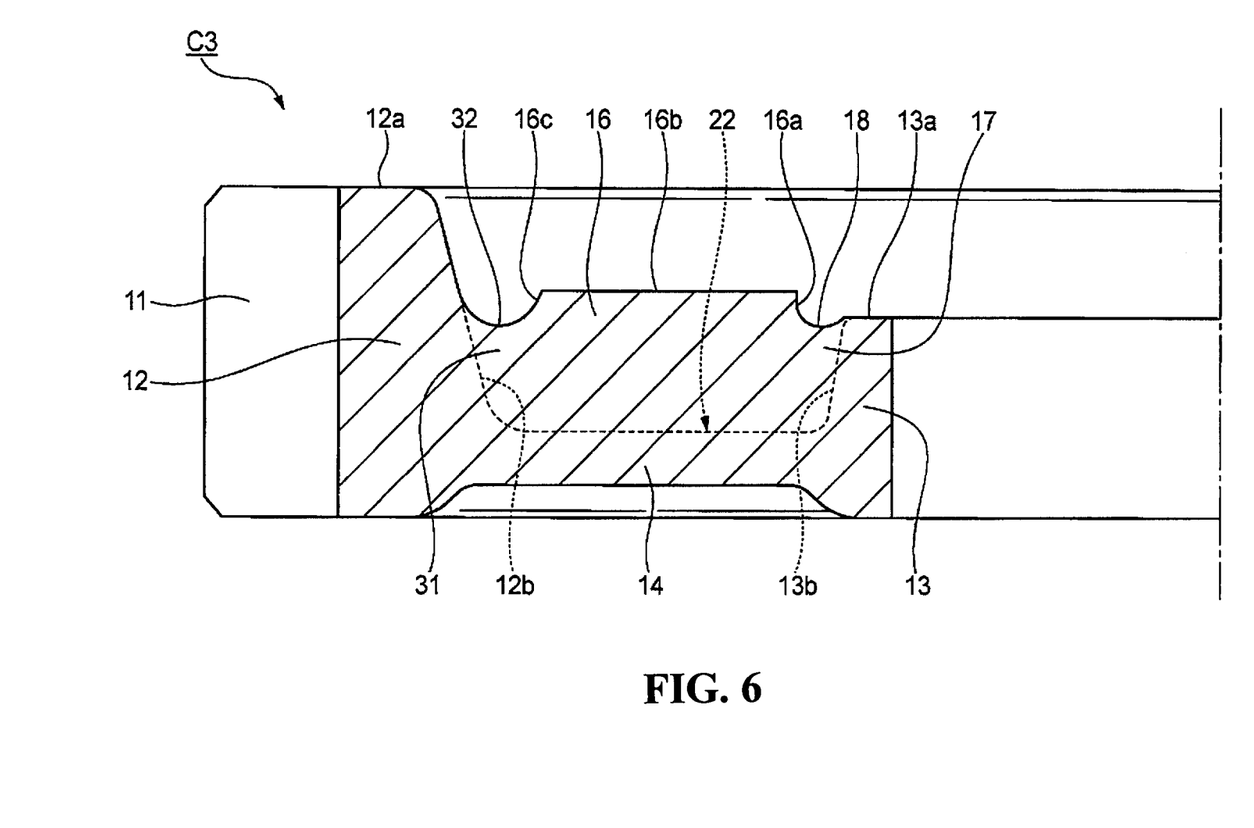
FIG. 6 is a cross-sectional view taken along line B-B in FIG. 5.

Referring to FIGS. 5 and 6, in a third-speed driven gear C3 of the present embodiment, the runout groove 18 is formed at the joint portion 17 between the boss portion 13 and the rib 16. In addition, also a runout portion 32 axially continuing from the rib 16 toward the axial end surface 12a of the rim portion 12 is formed at a joint portion 31 between the rim portion 12 and the rib 16.

As illustrated in FIGS. 5 and 6, the runout groove 32 is formed to extend from an axial end surface 16b of the rib 16 toward the axial inside. The runout groove 32 is formed to smoothly connect a circumferentially lateral surface 16c of the rib 16 with the inner circumferentially lateral surface 12b of the rim portion 12. The runout groove 32 is formed in a generally semicircular shape in cross-section, around the central axis of the third-speed driven gear C3. The runout groove 32 is formed to smoothly continue from its bottom toward the circumferentially lateral surface 16c of the rib 16. A rib 16 side end surface forming part of the runout groove 32 is formed to smoothly continue from the outer circumferential direction toward the inner circumferential direction. An axial end surface 16b of the rib 16 is subjected to lathe turning by means of a lathe or the like to form a machined surface.

As described above, in the third-speed driven gear C3 which is a dog clutch gear of the present embodiment, the runout groove 18 is formed at the joint portion 17 between the boss portion 13 and the rib 16 and also the runout groove 32 is formed at a joint portion 31 between the rim portion 12 and the rib 16. Therefore, it is possible to prevent stress concentration from occurring at both ends of the rib 16, which can further improve the durability of the third-speed driven gear C3.

In the third-speed driven gear C3 of the present embodiment, the runout groove 32 is formed to extend from the axial end surface 16b of the rib 16 toward the axial inside. Therefore, even if the axial end surface 16b of the rib 16 is machined with a large machining margin, a machined edge will not be formed at the joint portion 31. Thus, it is possible to prevent stress concentration due to a machined edge from occurring in the third-speed driven gear C3, which can improve the durability of the third-speed driven gear C3.

In the third-speed driven gear C3 of the present embodiment, the runout groove 32 is formed to smoothly connect the circumferential lateral surface 16c of the rib 16 with the inner circumferential lateral surface 12b of the rim portion 12. Therefore, it is possible to reduce stress applied to the runout groove 32, which can further improve the durability of the third-speed driven gear C3.

In the third-speed driven gear C3 of the present embodiment, the runout groove 32 is formed in a generally semicircular shape in cross-section, around the central axis of the third-speed driven gear C3. Therefore, it is possible to reduce stress applied to the runout groove 32, which can further improve the durability of the third-speed driven gear C3.

In the third-speed driven gear C3 of the present embodiment, the runout groove 32 is formed to smoothly continue from its bottom toward the circumferential lateral surface 16c of the rib 16. Therefore, it is possible to reduce stress applied to the runout groove 32, which can further improve the durability of the third-speed driven gear C3.

In the third-speed driven gear C3 of the present embodiment, the rib 16 side end surface forming part of the runout groove 32 is formed to smoothly continue from the outer circumferential direction toward the inner circumferential direction, which can reduce the number of places where stress concentration occurs.

The other configurations and function-effects are the same as those of the first embodiment.

Incidentally, the first and second embodiments described above exemplify application to the third-speed driven gear C3. The similar features may be applied to the first-speed driven gear C1, the second-speed driven gear C2 or the fourth-speed driven gear C4, for example.

A third embodiment of the dog clutch gear is next described with reference to FIGS. 7 and 8. Incidentally, the identical or the same portions as those of the first embodiment are denoted with like reference numerals and their explanations are omitted or simplified.

The present embodiment describes the dog clutch gear, taking the fifth-speed drive gear M5 as an example. Referring to FIGS. 7 and 8, the fifth-speed drive gear M5 includes a rim portion 12 formed with gear teeth 11 on the outer circumference; a boss portion 13 fitted to the main shaft 2 (rotating shaft) (see FIG. 1); an annular connecting portion 14 connecting the rim portion 12 with the boss portion 13; and a plurality of (four in the present embodiment) engaging convex portions 21, dog members, formed on a lateral surface of the annular connecting portion 14 at circumferentially generally-regular intervals.

Figure 7:
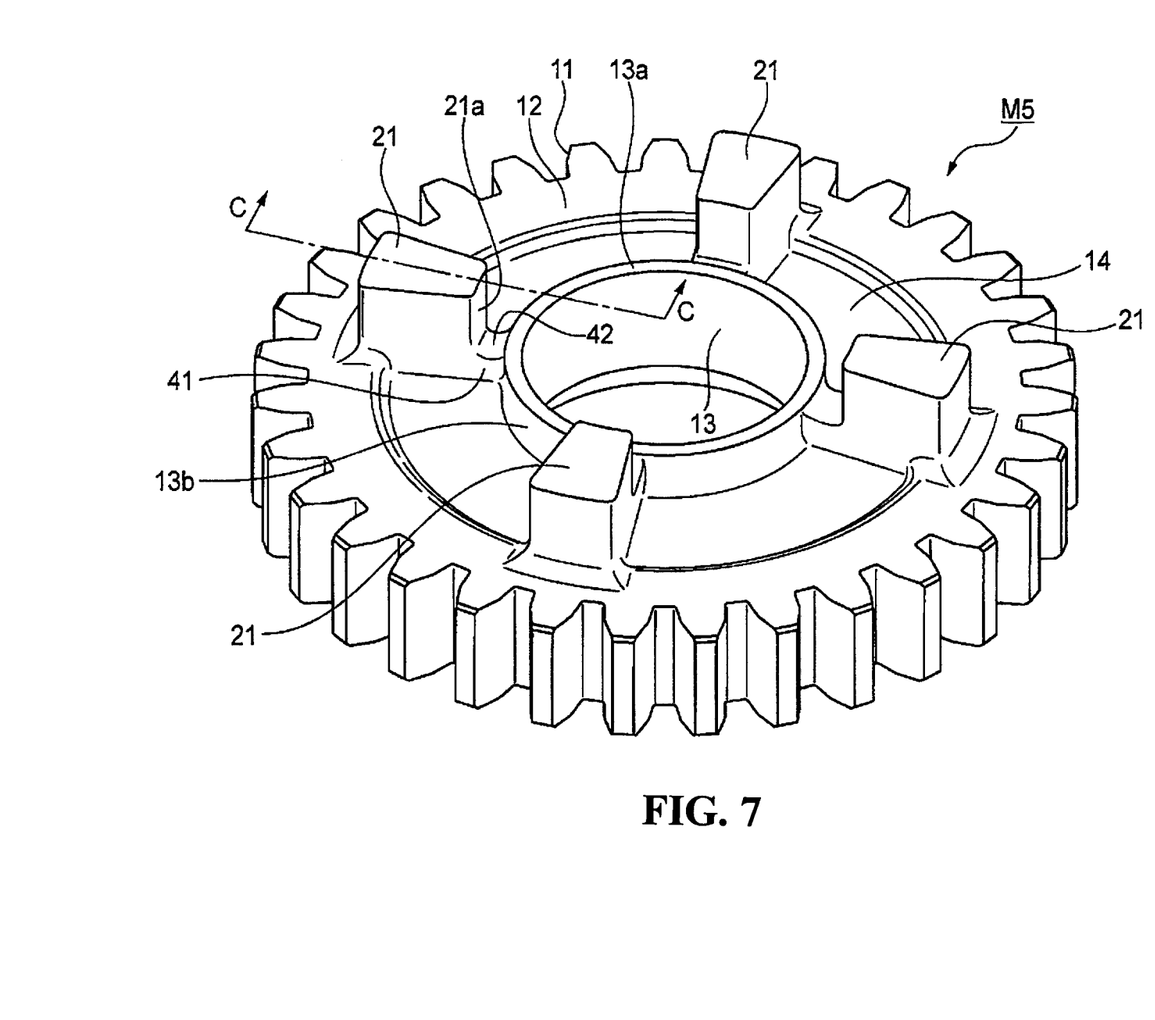
FIG. 7 is a perspective view of a third embodiment of the dog clutch gear.
Figure 8:
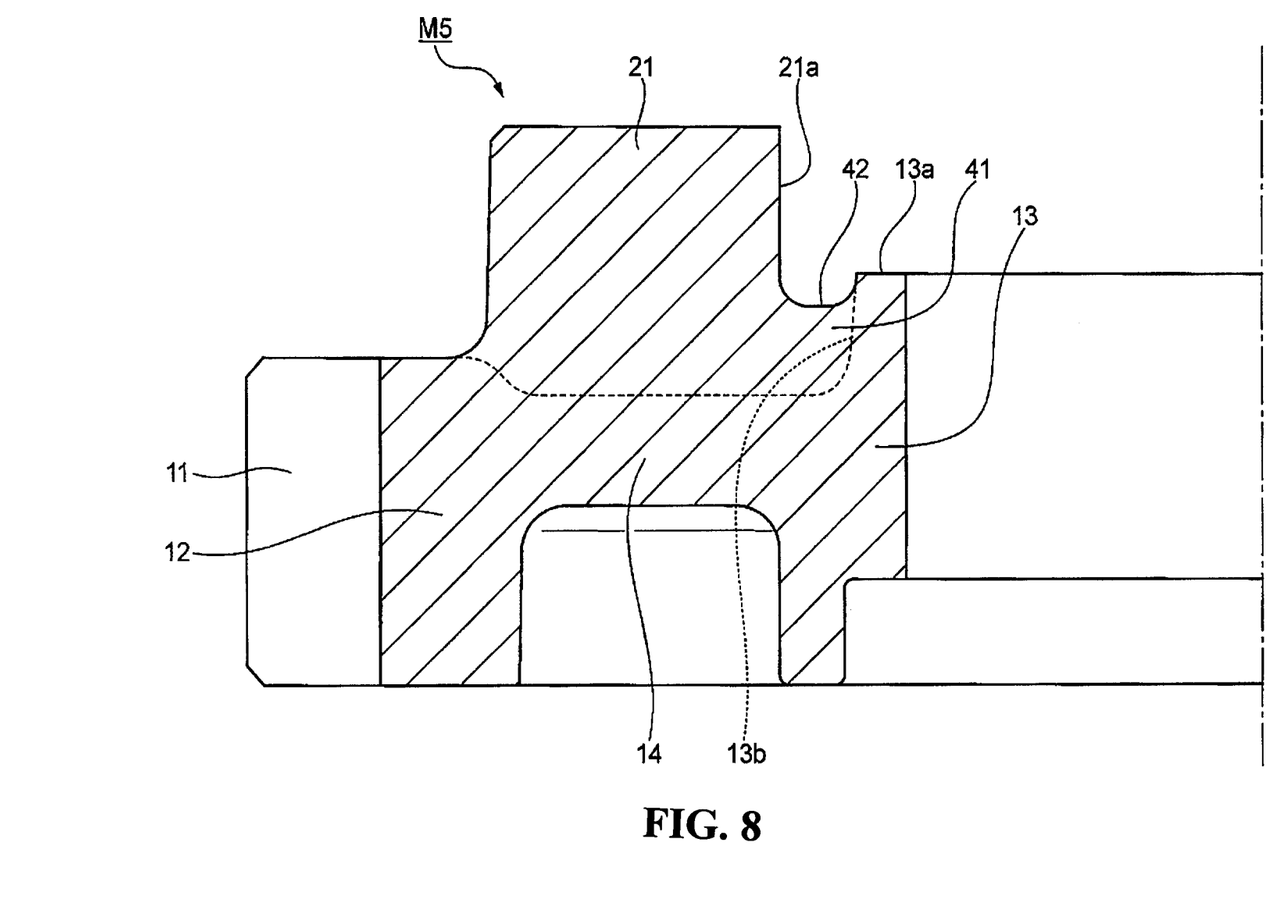
FIG. 8 is a cross-sectional view taken along line C-C in FIG. 7.

As illustrated in FIGS. 7 and 8, a runout groove 42 axially continuing from the engaging convex portion 21 toward the axial end surface 13a of the boss portion 13 is formed at the connecting portion 41 between the boss portion 13 and the engaging convex portion 21. The runout groove 42 is formed to extend from the axial end surface 13a of the boss portion 13 toward the axial inside. The runout groove 42 is formed to smoothly connect a circumferential lateral surface 21a of the engaging convex portion 21 with an outer circumferential lateral surface 13b of the boss portion 13. The runout groove 42 is formed like a bowl in cross-section, around the central axis of the fifth-speed drive gear M5. The runout groove 42 is formed to smoothly continue from its bottom toward a circumferential lateral surface 21a of the engaging convex portion 21. An engaging convex portion 21 side lateral end surface forming part of the runout groove 42 is formed to smoothly continue from the inner circumferential direction toward the outer circumferential direction. The axial end surface 13a of the boss portion 13 is subjected to lathe turning by means of a lathe or the like to form a machined surface.

As described above, in the fifth-speed drive gear M5, a dog clutch gear, of the present embodiment, the axial end surface 13a of the boss portion 13 is formed with the machined surface. In addition, the runout groove 42 axially continuing from the engaging convex portion 21 toward the axial end surface 13a of the boss portion 13 is formed at the joint portion 41 between the boss portion 13 and the engaging convex portion 21 which is a dog member. Therefore, when the axial end surface 13a of the boss portion 13 is machined, the engaging convex portion 21 will not be subjected to cutting work. In this way, the joint portion 41 will not be formed with a machined edge. Thus, it is possible to prevent stress concentration due to the machined edge from occurring in the fifth-speed drive gear M5, which can improve the durability of the fifth-speed drive gear M5. Since the engaging convex portion 21 is not subjected to cutting work, it is possible to prevent a cutting load from being intermittently applied to a cutting tool, which can lengthen the lifetime of the cutting tool.

In the fifth-speed drive gear M5 of the present embodiment, the runout groove 42 is formed to extend from the axial end surface 13a of the boss portion 13 toward the axial inside. Therefore, even if the axial end surface 13a of the boss portion 13 is machined with a large machining margin, a machined edge is not formed at the joint portion 41. Thus, it is possible to prevent stress concentration due to the machined edge from occurring in the fifth-speed drive gear M5, which can improve the durability of the fifth-speed drive gear M5.

In the fifth-speed drive gear M5 of the present embodiment, the runout groove 42 is formed to smoothly connect the circumferential lateral surface 21a of the engaging convex portion 21 with the outer circumferential lateral surface 13b of the boss portion 13. Therefore, it is possible to reduce stress applied to the runout groove 42, which can further improve the durability of the fifth-speed drive gear M5.

In the fifth-speed drive gear M5 of the present embodiment, the runout groove 42 is formed like a bowl in cross-section, around the central axis of the fifth-speed drive gear M5. Therefore, it is possible to reduce stress applied to the runout groove 42, which can further improve the durability of the fifth-speed drive gear M5.

In the fifth-speed drive gear M5 of the present embodiment, the runout groove 42 is formed to smoothly continue from its bottom toward the circumferential lateral surface 21a of the engaging convex portion 21. Therefore, it is possible to reduce stress applied to the runout groove 42, which can further improve the durability of the fifth-drive gear M5.

In the fifth-speed drive gear M5 of the present embodiment, the engaging convex portion 21 side end surface forming part of the runout groove 42 is formed to smoothly continue from the inner circumferential direction toward the outer circumferential direction. Therefore, it is possible to reduce the number of places where stress concentration occurs.

The other configurations and function-effects are the same as those of the first embodiment.

Incidentally, the present embodiment described above exemplifies application to the fifth-speed drive gear M5. The similar features may be applied to the third-speed drive gear M3, the fourth-speed drive gear M4, the sixth-speed drive gear M6, the fifth-speed driven gear C5, or the sixth-speed driven gear C6, for example.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A dog clutch gear, comprising:
    a rim portion having power transmission teeth on an outer circumference;
    a boss portion fittable to a rotating shaft, said boss portion having a machined surface on an axial end surface thereof;
    an annular connecting portion connecting said rim portion with said boss portion; and
    a dog member on a lateral surface of said annular connecting portion,
    wherein a runout groove, axially continuing from said dog member toward said axial end surface of said boss portion, is formed at a joint portion between said boss portion and said dog member, and
    wherein said dog clutch gear is engageable with an adjacent gear dog member, on the rotating shaft, to transfer a rotational force.

2. The dog clutch gear according to claim 1, wherein said runout groove extends from said axial end surface of said boss portion toward an axial inside of said dog clutch gear.

3. The dog clutch gear according to claim 2, wherein an outer runout groove, axially continuing from said dog member toward an axial end surface of said rim portion, is formed at a joint portion between said rim portion and said dog member.

4. The dog clutch gear according to claim 1, wherein said runout groove smoothly connects a circumferential lateral surface of said dog member with an outer circumferential lateral surface of said boss portion.

5. The dog clutch gear according to claim 4, wherein an outer runout groove, axially continuing from said dog member toward an axial end surface of said rim portion, is formed at a joint portion between said rim portion and said dog member.

6. The dog clutch gear according to claim 5, wherein said runout groove has a generally semicircular shape in cross-section, and is disposed about a central axis of said dog clutch gear.

7. The dog clutch gear according to claim 6, wherein said outer runout groove has a bowl shape in cross-section, and is disposed about a central axis of the dog clutch gear.

8. The dog clutch gear according to claim 7, wherein said runout groove smoothly continues from a bottom thereof toward said circumferential lateral surface of said dog member.

9. The dog clutch gear according to claim 8, wherein a dog member side end surface forms part of said runout groove, and smoothly continues from an inner circumferential direction toward an outer circumferential direction of said dog clutch gear.

10. The dog clutch gear according to claim 1, wherein an outer runout groove, axially continuing from said dog member toward an axial end surface of said rim portion, is formed at a joint portion between said rim portion and said dog member.

* * * * *